United States Patent
Yang et al.

(10) Patent No.: US 11,689,140 B2
(45) Date of Patent: Jun. 27, 2023

(54) COMMUTATION CONTROL METHOD AND DEVICE FOR BRUSHLESS DIRECT CURRENT MOTOR, AND STORAGE MEDIUM

(71) Applicants: Guangdong Midea White Home Appliance Technology Innovation Center Co., Ltd., Foshan (CN); Midea Group Co., Ltd., Foshan (CN)

(72) Inventors: Lei Yang, Foshan (CN); Ziqiang Zhu, Foshan (CN); Hong Bin, Foshan (CN)

(73) Assignees: GUANGDONG MIDEA WHITE HOME APPLIANCE TECHNOLOGY INNOVATION CENTER CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 55 days.

(21) Appl. No.: 17/560,073

(22) Filed: Dec. 22, 2021

(65) Prior Publication Data
US 2022/0123685 A1 Apr. 21, 2022

Related U.S. Application Data

(63) Continuation of application No. PCT/CN2019/098114, filed on Jul. 29, 2019.

(51) Int. Cl.
*H02P 27/08* (2006.01)
*H02P 25/03* (2016.01)
*H02P 23/14* (2006.01)

(52) U.S. Cl.
CPC .............. *H02P 27/08* (2013.01); *H02P 23/14* (2013.01); *H02P 25/03* (2016.02)

(58) Field of Classification Search
CPC .. H02P 6/00; H02P 6/005; H02P 6/007; H02P 6/06; H02P 6/08; H02P 6/085;
(Continued)

(56) References Cited

U.S. PATENT DOCUMENTS

2002/0030462 A1 3/2002 Matsushiro et al.
2004/0130284 A1 7/2004 Lee
(Continued)

FOREIGN PATENT DOCUMENTS

CN 1518205 A 8/2004
CN 104702174 A 6/2015
(Continued)

OTHER PUBLICATIONS

Midea Group Co., Ltd., JP Office Action, Japanese Patent Application No. 2021-578113, dated Nov. 29, 2022, 12 pgs.
(Continued)

*Primary Examiner* — Antony M Paul
(74) *Attorney, Agent, or Firm* — Morgan, Lewis & Bockius LLP (57) ABSTRACT

A commutation control method, a device for a brushless direct current motor, and a storage medium are described. The method includes performing detection on a position of a rotor in a brushless direct current motor. The detection is further configured to be triggered by commutation of the brushless direct current motor. The method includes determining, for the brushless direct current motor, a first drive scheme corresponding to the detected position of the rotor, the first drive scheme indicates a manner in which a three-phase full-bridge circuit of the brushless direct current motor operates; updating a pulse width modulation (PWM) drive signal, the updating is performed on the basis of the first drive scheme; and using the updated PWM drive signal to control the brushless direct current motor to perform commutation.

12 Claims, 9 Drawing Sheets

(58) Field of Classification Search
CPC ...... H02P 6/10; H02P 6/12; H02P 6/14; H02P 6/15; H02P 6/153; H02P 6/157; H02P 6/16; H02P 6/182; H02P 6/28; H02P 7/00; H02P 7/05; H02P 7/29; H02P 27/00; H02P 27/04; H02P 27/06; H02P 27/08; H02P 27/085; H02P 21/00; H02P 21/18; H02P 21/14; H02P 21/22; H02P 23/00; H02P 23/14; H02P 25/00; H02P 25/062; H02P 25/064; H02P 1/00; H02P 1/24; H02P 1/26; H02P 1/42; H02P 1/46
See application file for complete search history.

(56) References Cited

U.S. PATENT DOCUMENTS

| | | | |
|---|---|---|---|
| 2007/0046234 A1* | 3/2007 | Crabill | H02P 6/15 318/400.01 |
| 2019/0149071 A1 | 5/2019 | Brown et al. | |

FOREIGN PATENT DOCUMENTS

| | | |
|---|---|---|
| CN | 106788048 A | 5/2017 |
| CN | 108011549 A | 5/2018 |
| CN | 108696207 A | 10/2018 |
| JP | H 06261591 A | 9/1994 |
| JP | H 11318097 A | 11/1999 |
| JP | 2004215489 A | 7/2004 |
| WO | WO 2017187533 A1 | 11/2017 |

OTHER PUBLICATIONS

Midea Group Co., Ltd., IPRP, PCT/CN2019/098114, dated Feb. 1, 2022, 5 pgs.
Extended European Search Report, EP19939894.2, dated May 25, 2022, 8 pgs.
Midea Group Co., Ltd., WO, PCT/CN2019/098114, Apr. 29, 2020, 7 pgs.
International Search Report, CN Application No. PCT/CN2019/098114, dated Apr. 29, 2020, 5 pgs.

* cited by examiner

COMMUTATION CONTROL METHOD AND DEVICE FOR BRUSHLESS DIRECT CURRENT MOTOR, AND STORAGE MEDIUM

CROSS-REFERENCE TO RELATED APPLICATIONS

This application is a continuation of PCT International Application No. PCT/CN2019/098114, filed Jul. 29, 2019 entitled "Commutation Control Method And Device For Brushless Direct Current Motor, and Storage Medium," the entire content of which is incorporated herein by reference.

TECHNICAL FIELD

The disclosure relates to the technical field of motor control, and in particular to a commutation control method and device for a Brush Less Direct Current Motor (BLDCM), and a storage medium.

BACKGROUND

Currently, a high-speed miniaturized BLDCM is more and more widely used, especially in a field of a small electric tool such as a hand-held vacuum cleaner, or the like.

Figure 1:
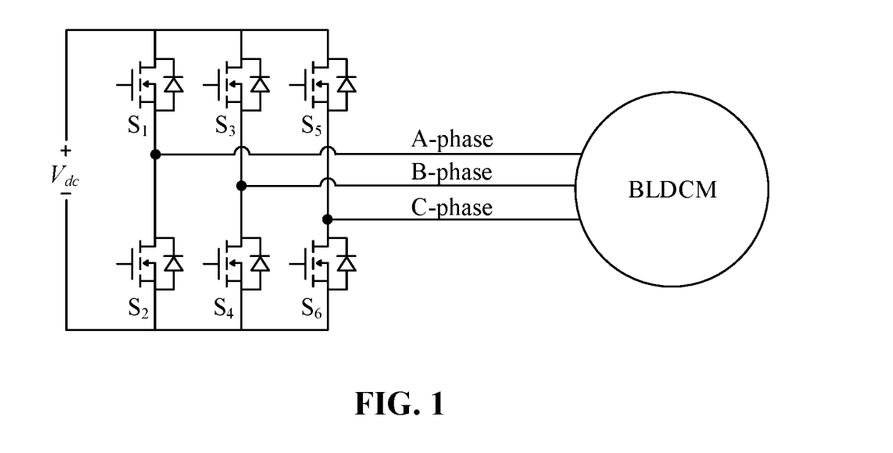
FIG. 1 is a schematic diagram of driving a three-phase full-bridge circuit of a BLDCM in the related art.

As shown in FIG. 1, in the related art, a three-phase six-state Pulse Width Modulation (PWM) drive signal is usually acted to a three-phase full-bridge circuit, to control on and off of a corresponding bridge arm switching device in the three-phase full-bridge circuit, thereby implementing commutation control for the BLDCM.

However, in a practical application, the PWM drive signal may not be able to control the BLDCM to perform commutation in time.

SUMMARY

In order to solve the problem in the related art, embodiments of the disclosure proposes a commutation control method and device for a BLDCM, and a storage medium, which is capable of implementing a timely commutation for the BLDCM.

Embodiments of the disclosure provide a commutation control method for a BLDCM, which includes the following operations.

A position of a rotor in the BLDCM is detected, here the detecting is further configured to be triggered by commutation of the BLDCM.

A first drive scheme, corresponding to the detected position of the rotor, of the BLDCM is determined, here the first drive scheme indicates a manner in which a three-phase full-bridge circuit of the BLDCM operates.

A PWM drive signal is updated, here the updating is performed on the basis of the first drive scheme.

The BLDCM is controlled by using the updated PWM drive signal, to perform commutation.

In the above solution, the operation of updating the PWM drive signal, here the updating is performed on the basis of the first drive scheme includes the following operations.

A duty cycle of the PWM drive signal is updated according to the first drive scheme.

A phase of the PWM drive signal is updated.

In the above solution, the operation of updating, according to the first drive scheme, the duty cycle of the PWM drive signal includes the following operations.

An operating voltage of each of switching devices in the three-phase full-bridge circuit is determined by using the first drive scheme.

A duty cycle of a respective PWM drive signal corresponding to each of the switching devices is updated by using the determined operating voltage of each of the switching devices.

In the above solution, for each of the switching devices in the three-phase full-bridge circuit, the duty cycle of the PWM drive signal is updated by updating a value of a first register corresponding to the duty cycle of the respective PWM drive signal.

In the above solution, the operation of updating the phase of the PWM drive signal includes the following operations.

The phase of the PWM drive signal is updated by updating a value of a second register corresponding to a PWM carrier signal.

In the above solution, the operation of updating, by updating the value of the second register corresponding to the PWM carrier signal, the phase of the PWM drive signal includes the following operations.

An updated carrier signal is obtained by setting the value of the second register to a specific value when it is determined that commutation is to be carried out.

The phase of the PWM drive signal is updated by using the updated carrier signal.

In the above solution, the method further includes the following operations.

A back electromotive force signal of the BLDCM is acquired.

A back electromotive force zero-crossing point (ZCP) time of the BLDCM is determined according to the acquired back electromotive force signal.

It is determined that the BLDCM is to be commutated when a first time elapses after the back electromotive force ZCP time.

In the above solution, the operation of determining the first drive scheme, corresponding to the detected position of the rotor, of the BLDCM includes the following operations.

A drive scheme corresponding to the detected position of the rotor is found in a first mapping table.

The found drive scheme is used as the first drive scheme.

In the above solution, a PWM modulation scheme of the PWM drive signal is H-PWM-L-ON, or H-ON-L-PWM, or ON-PWM, or PWM-ON.

Embodiments of the disclosure further provide a commutation control device for a BLDCM, which includes a first determination unit, a second determination unit, an updating unit and a control unit.

The first determination unit is configured to detect a position of a rotor in the BLDCM, here the detecting is further configured to be triggered by commutation of the BLDCM.

The second determination unit is configured to determine a first drive scheme, corresponding to the detected position of the rotor, of the BLDCM, here the first drive scheme indicates a manner in which a three-phase full-bridge circuit of the BLDCM operates.

The updating unit is configured to update a PWM drive signal, here the updating is performed on the basis of the first drive scheme.

The control unit is configured to control the BLDCM by using the updated PWM drive signal, to perform commutation.

Embodiments of the disclosure further provide a commutation control device for a BLDCM. The device includes: a processor, and a memory configured to store computer programs executable on the processor.

The processor is configured to perform operations of any one of the above methods when executing the computer programs.

Embodiments of the disclosure further provide a storage medium having stored therein computer programs that, when executed by a processor, causes the processor to implement operations of any one of the above methods.

In the commutation control method and device for the BLDCM, and the storage medium provided by the embodiments of the disclosure, a position of a rotor in the BLDCM is detected, here the detecting is further configured to be triggered by commutation of the BLDCM; a first drive scheme, corresponding to the detected position of the rotor, of the BLDCM is determined, here the first drive scheme indicates a manner in which a three-phase full-bridge circuit of the BLDCM operates; a PWM drive signal is updated, here the updating is performed on the basis of the first drive scheme; and the BLDCM is controlled by using the updated PWM drive signal, to perform commutation. In the solutions provided by the embodiments of the disclosure, when the BLDCM is to be commutated, updating to obtain the PWM drive signal by using the first drive scheme enables a commutation action to take effect immediately, so that timeliness of commutation for the BLDCM and stability of commutation period may be ensured.

DETAILED DESCRIPTION OF THE DISCLOSURE

In order to make the objective, technical solutions and advantages of embodiments of the disclosure clearer, specific technical solutions of the disclosure are further described in detail below in conjunction with the accompanying drawings of the embodiments of the disclosure. The following embodiments are intended to explain the disclosure, but are not intended to limit the scope of the disclosure.

In the embodiments of the disclosure, the PWM modulation scheme of the PWM drive signal is a modulation scheme suitable for a high-speed BLDCM, such as H-PWM-L-ON, or H-ON-L-PWM, or ON-PWM, or PWM-ON, etc. FIGS. 2A, 2B, 2C and 2D show that the above-mentioned H-PWM-L-ON, H-ON-L-PWM, ON-PWM and PWM-ON modulation schemes correspond to drive schemes of six switching devices S1 to S6 in a three-phase full-bridge circuit of FIG. 1 respectively. In the following descriptions, the PWM modulation scheme of H-PWM-L-ON is taken as an example.

In the related art, a commutation technique of the BLDCM has a problem that the PWM drive signal cannot control the BLDCM to perform commutation in time under a high-speed condition. The failure of the BLDCM to perform commutation in time further causes a series of negative phenomena, including: commutation delay, commutation unevenness, and disappearance of back electromotive force ZCP.

Figure 3:
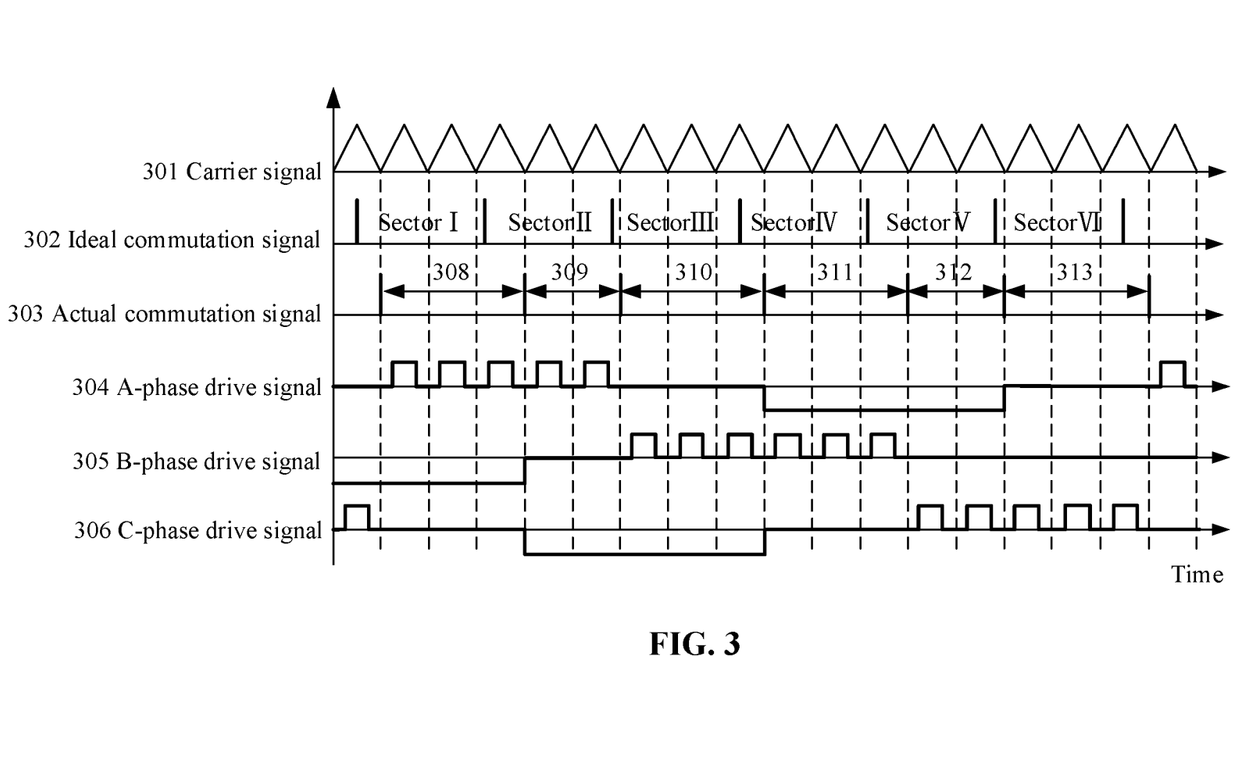
FIG. 3 is a schematic diagram of a carrier signal, an ideal commutation signal, an actual commutation signal, and respective phase drive signals in the related art.

Here, the failure to perform commutation in time is shown in FIG. 3. As shown in FIG. 3, an ideal commutation signal 302 may appear at any position of a PWM carrier signal 301, but a PWM state of a PWM drive signal may be updated only when the PWM carrier signal 301 is at a minimum value (such as zero) or a maximum value (such as a period value) (that is, a state of a switching device corresponding to the PWM drive signal may be updated only when the amplitude of the PWM carrier signal is at a minimum value or a maximum value). Here, a case where the PWM state is updated at the zero point is taken as an example, when the ideal commutation signal 302 appears, the PWM state cannot be updated in time until the carrier signal 301 has a zero point. Therefore, an actual commutation signal 303 always lags behind the ideal commutation signal 302. Reference numerals 304, 305 and 306 show drive signals of A-phase, B-phase and C-phase, respectively. The failure of the BLDC to perform commutation in time results in the following impacts.

1. Commutation Delay

Since the BLDCM cannot perform commutation in time, the commutation operation of the BLDCM is delayed to a zero point of the current carrier. At this time, commutation for the BLDCM has a maximum delay of one PWM period. As the rotation speed of the BLDCM increases, a carrier ratio (that is, a ratio of a carrier frequency to an operating frequency of the BLDCM) becomes lower, and the proportion of a delay time (that is, a ratio of the delay time to the period of the carrier signal) increases. At this time, the current of the BLDCM increases sharply and its efficiency decreases.

2. Commutation Unevenness

Since the BLDCM cannot perform commutation in time, in FIG. 3, the period of the actual commutation signal 303 may only be integral times of the period of the carrier signal 301, and the period of the ideal commutation signal 302 is 2.7 times of the period of the carrier signal 301. Therefore, the period of the actual commutation signal 303 may have two PWM carrier periods (indicated by 309 and 312) or three PWM periods (indicated by 308, 310, 311 and 313), which causes commutation unevenness. Moreover, when the rotation speed of the BLDCM increases, the actual number of PWM waves per sector decreases, and the phenomenon of commutation unevenness becomes serious. At this time, oscillation of the current of the BLDCM becomes larger and the noise becomes larger.

3. Disappearance of ZCP

Since the BLDCM cannot perform commutation in time, freewheeling end time of the BLDCM is delayed in a short commutation period (such as indicated by 309 and 312 in FIG. 3). At this time, the phenomenon of disappearance of a ZCP may occur (here, it may be understood by those skilled in the art that under an ideal condition, it is desirable for the BLDCM to perform commutation when it is at a position such as 0 degree, 60 degree, 120 degree, etc., and it is able to detect the ZCP when it is at a position such as 30 degree, 90 degree, 150 degree, etc. Assuming that the commutation freewheeling time for the BLDCM is equivalent to the time taken for the BLDCM to rotate 20 degree, then after the BLDCM performs commutation when it is at the position of 0 degree, the freewheeling ends when it is at the position of 20 degree, and at this time, the ZCP may be detected when it is at the position of 30 degree. However, when the BLDCM has a commutation delay, for example, commutation that should be performed when it is at the position of 0 degree is delayed to be performed until it is at the position of 15 degree, the freewheeling end time will occur when it is at the position of 35 degree (15 degree+20 degree=35 degree), and at this time, the ZCP cannot be detected when it is at the position of 30 degree, that is, the phenomenon of disappearance of the ZCP occurs), even the sensorless solution for the BLDCM becomes unstable.

Based on the above descriptions, in various embodiments of the disclosure, a position of a rotor in the BLDCM is detected, here the detecting is further configured to be triggered by commutation of the BLDCM; a first drive scheme, corresponding to the detected position of the rotor, of the BLDCM is determined, here the first drive scheme indicates a manner in which a three-phase full-bridge circuit of the BLDCM operates; a PWM drive signal is updated, here the updating is performed on the basis of the first drive scheme; the BLDCM is controlled by using the updated PWM drive signal, to perform commutation, so as to achieve a maximum possibility of timely commutation.

Figure 4:
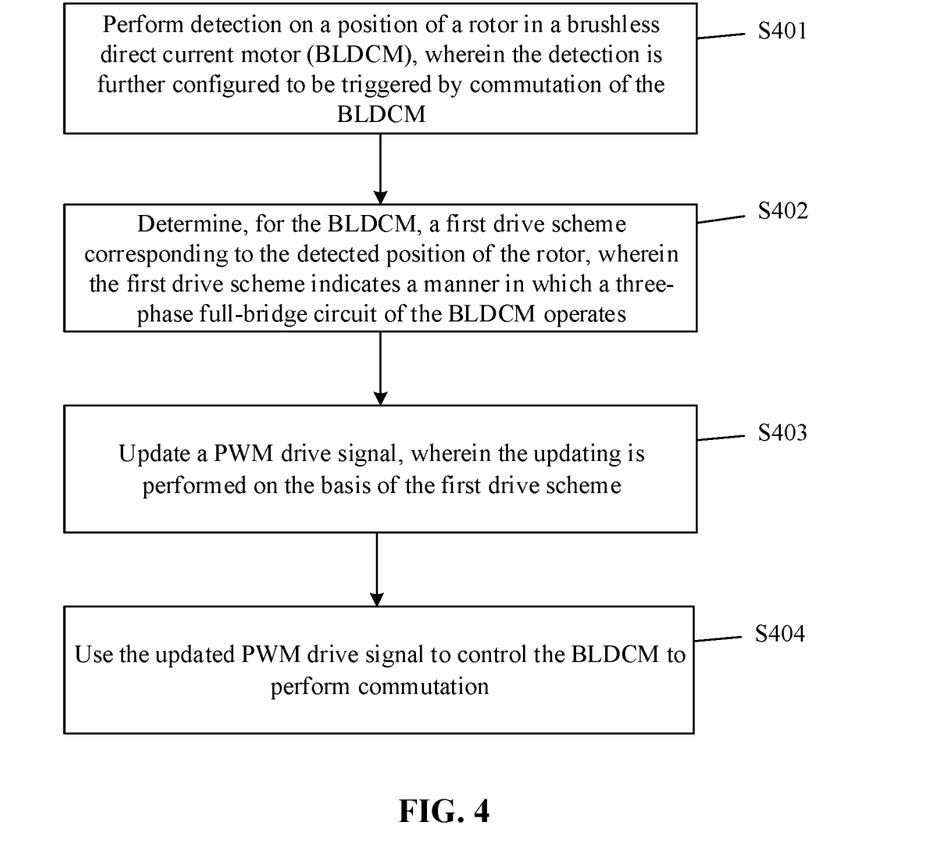
FIG. 4 is a schematic flowchart of a commutation control method for a BLDCM according to some embodiments of the disclosure.

Embodiments of the disclosure provide a commutation control method for a BLDCM, which includes the following operations as shown in FIG. 4.

In operation S401: a position of a rotor in the BLDCM is detected, here the detecting is further configured to be triggered by commutation of the BLDCM.

In a practical application, the position of the rotor in the BLDCM is from 0 degree to 360 degree, and every 60 degree is classified as a sector, and there are six sectors in total. Sector I is from 0 degree to 60 degree, sector II is from 60 degree to 120 degree, sector III is from 120 degree to 180 degree, sector IV is from 180 degree to 240 degree, sector V is from 240 degree to 300 degree, and sector VI is from 300 degree to 360 degree (0 degree).

Here, the operation that the detecting is further configured to be triggered by commutation of the BLDCM may be understood as performing a corresponding detection when it is determined that the BLDCM is to be commutated. The time when the BLDCM is to be commutated refers to an ideal time for commutating the BLDCM, that is, the time when the rotor in the BLDCM is at the position of 60 degree, or 120 degree, or 180 degree, or 240 degree, or 300 degree, or 360 degree (0 degree). At this time, the specific position of the rotor in the BLDCM is detected to determine sectors where the BLDCM performs commutation, for example, when 60 degree, or 120 degree, or 180 degree, or 240 degree, or 300 degree, or 360 degree (0 degree) is detected, it may be determined that the BLDCM is to be commutated. At this time, when it is further detected that the rotor in the BLDCM is at the position of 60 degree, it may be determined that the BLDCM will commutate from sector I to sector II.

In a practical application, the position of the rotor in the BLDCM may be obtained by a sensorless technique, or may be directly read by a rotor position sensor (Hall sensor, photoelectric encoder, etc.) in the BLDCM.

In some embodiments, a specific manner of obtaining the position of the rotor in the BLDCM by the sensorless technique includes the following operations. A back electromotive force signal of the BLDCM is acquired. A back electromotive force ZCP time of the BLDCM is determined according to the acquired back electromotive force signal. It is determined that the BLDCM is to be commutated when a first time elapses after the back electromotive force ZCP time.

Here, the first time is the time taken for the position of the rotor in the BLDCM to be changed by 30 degree. Compared with the manner of reading the position of the rotor by a sensor, the sensorless technique that obtains the position of the rotor in the BLDCM does not need to be additionally equipped with a sensor and thus reduces hardware cost and increases the reliability to a certain extent.

In operation S402: a first drive scheme, corresponding to the detected position of the rotor, of the BLDCM is determined, here the first drive scheme indicates a manner in which a three-phase full-bridge circuit of the BLDCM operates.

Figure 2A:
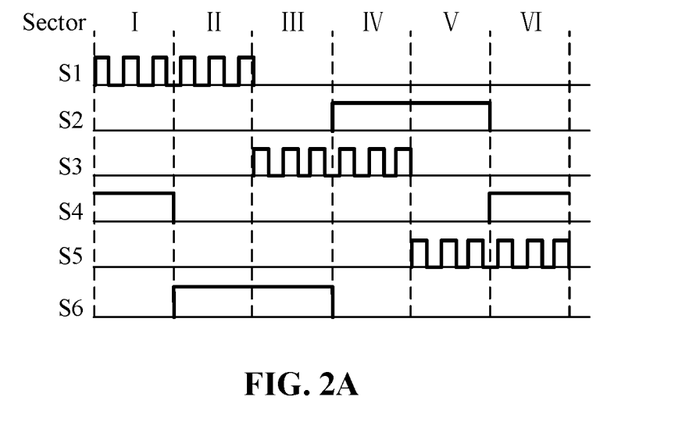
FIG. 2A is a schematic diagram of an H-PWM-L-ON modulation scheme in the related art.
Figure 2B:
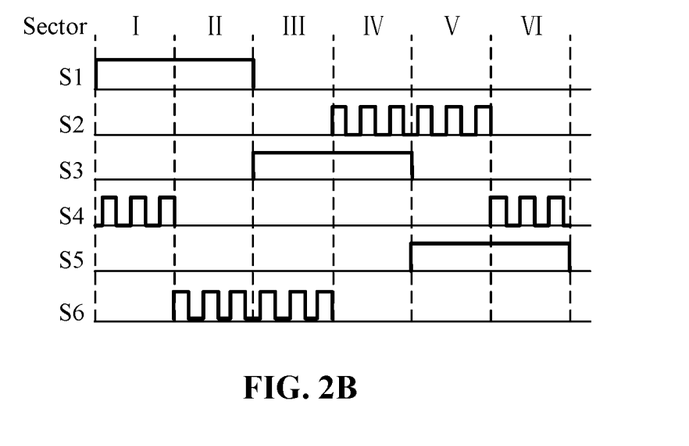
FIG. 2B is a schematic diagram of an H-ON-L-PWM modulation scheme in the related art.
Figure 2C:
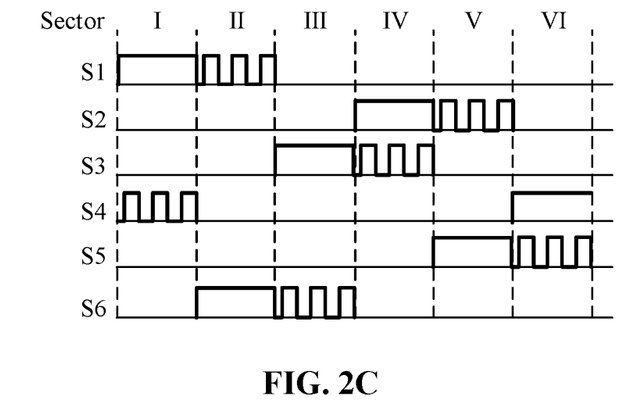
FIG. 2C is a schematic diagram of an ON-PWM modulation scheme in the related art.
Figure 2D:
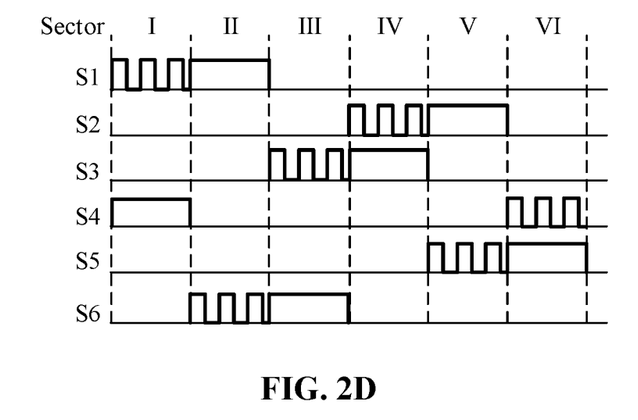
FIG. 2D is a schematic diagram of a PWM-ON modulation scheme in the related art.

Here, in a practical application, the first drive scheme may indicate an ideal drive scheme of the three-phase full-bridge circuit of the BLDCM (for example, the drive schemes of six switching devices S1 to S6 in the three-phase full-bridge circuit corresponding to the H-PWM-L-ON modulation scheme as shown in FIG. 2A); may also be another optimized drive scheme of the three-phase full-bridge circuit of the BLDCM.

In a practical application, after determining sectors where commutation is performed, the first drive scheme may be obtained by finding in a mapping table preset in a program, or it may be obtained by another manner, which is not limited here.

In some embodiments, the specific manner of obtaining the first drive scheme by finding in the table includes the following operations. A drive scheme corresponding to the detected position of the rotor is found in a first mapping table. The found drive scheme is used as the first drive scheme.

Here, the first mapping table is a table that has established a corresponding mapping relationship between the position of the rotor in the BLDCM and the corresponding first drive scheme, and has been stored in advance.

In operation S403: a PWM drive signal is updated, here the updating is performed on the basis of the first drive scheme.

Here, the PWM drive signal refers to the PWM drive signal acting on the three-phase full-bridge circuit of the BLDCM. In a practical application, six switching devices in the three-phase full-bridge circuit correspond to different PWM drive signals respectively, that is, three-phase six-state PWM drive signals. The PWM drive signal of each of the switching devices may control the operating state of the corresponding switching device.

In the related art, the state of the PWM drive signal may be updated only when the amplitude of the PWM carrier signal is at a minimum value or a maximum value, therefore a commutation delay may occur by using the PWM drive signal in the related art. Here, the PWM drive signal is updated by using the first drive scheme, the updated PWM drive signal enables the commutation action to take effect immediately.

In some embodiments of the disclosure, the operation of updating the PWM drive signal, here the updating is performed on the basis of the first drive scheme includes the following operations.

A duty cycle of the PWM drive signal is updated according to the first drive scheme.

A phase of the PWM drive signal is updated.

Here, updating the phase of the PWM drive signal is performed at a certain moment when the BLDCM is to be commutated.

In some embodiments, the operation of updating, according to the first drive scheme, the duty cycle of the PWM drive signal includes the following operations.

An operating voltage of each of switching devices in the three-phase full-bridge circuit is determined by using the first drive scheme.

A duty cycle of a respective PWM drive signal corresponding to each of the switching devices is updated by using the determined operating voltage of each of the switching devices.

Here, in a practical application, updating the PWM drive signal of the BLDCM is specifically implemented by updating a register in software.

Based on the above descriptions, in some embodiments, for each of the switching devices in the three-phase full-bridge circuit, the duty cycle of the PWM drive signal is updated by updating a value of a first register corresponding to the duty cycle of the respective PWM drive signal.

In some embodiments, the operation of updating the phase of the PWM drive signal includes the following operations.

The phase of the PWM drive signal is updated by updating a value of a second register corresponding to a PWM carrier signal.

In some embodiments, the operation of updating, by updating the value of the second register corresponding to the PWM carrier signal, the phase of the PWM drive signal includes the following operations.

An updated carrier signal is obtained by setting the value of the second register to a specific value when it is determined that commutation is to be carried out.

The phase of the PWM drive signal is updated by using the updated carrier signal.

Here, the specific value is a maximum value or a minimum value of the second register.

In operation S404: the BLDCM is controlled by using the updated PWM drive signal, to perform commutation.

Here, the updated PWM drive signal may control the operating state (such as, on or off) of the corresponding switching device to control the BLDCM to perform commutation.

Embodiments of the disclosure provide a commutation control method for a BLDCM, in which a position of a rotor in the BLDCM is detected, here the detecting is further configured to be triggered by commutation of the BLDCM; a first drive scheme, corresponding to the detected position of the rotor, of the BLDCM is determined, here the first drive scheme indicates a manner in which a three-phase full-bridge circuit of the BLDCM operates; a PWM drive signal is updated, here the updating is performed on the basis of the first drive scheme; and the BLDCM is controlled by using the updated PWM drive signal, to perform commutation. In the solution provided by some embodiments of the disclosure, when the BLDCM is to be commutated, updating to obtain the PWM drive signal by using the first drive scheme enables a commutation action to take effect immediately, so that timeliness of commutation for the BLDCM and stability of commutation period may be ensured.

Moreover, the solutions of the embodiments of the disclosure do not require improvements in hardware, and implement timely commutation for the BLDCM only by software, which does not increase the hardware cost, and is simple and convenient to implement.

The disclosure will be described in detail below in conjunction with specific application examples.

Figure 5:
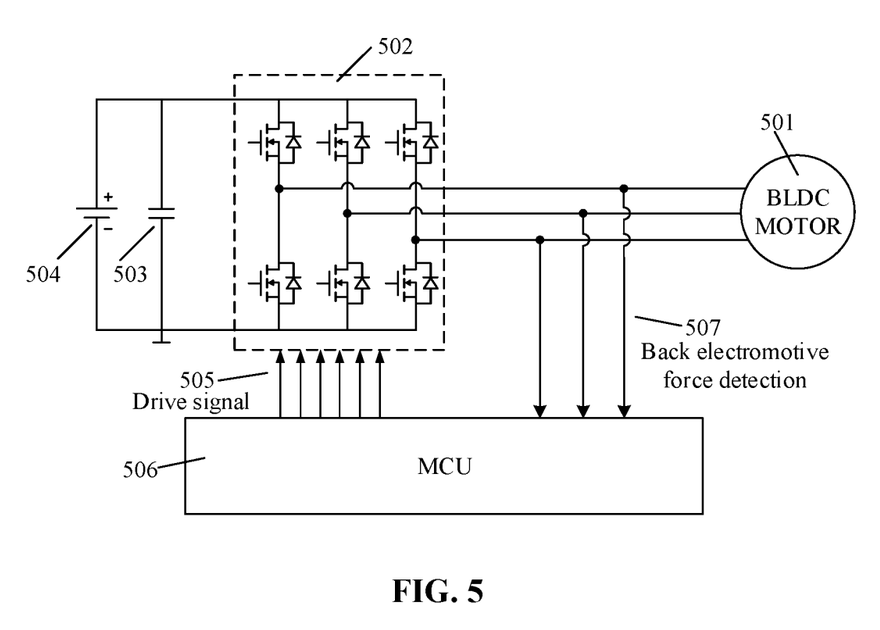
FIG. 5 is a schematic structural diagram of some application embodiments of the disclosure where a BLDCM is applied to a hardware system in an electronic device.

In some application embodiments, the BLDCM has six sectors, and it is implemented as shown in FIG. 5 where the BLDCM is applied to a hardware system in an electronic device. As shown in FIG. 5, the system includes: a BLDCM 501, a three-phase full-bridge circuit 502, a direct current (DC) bus capacitor 503, a battery 504, a PWM drive signal 505, a microcontroller unit (MCU) 506, and a back electromotive force detection circuit 507.

In a practical application, the MCU 506 may also be a central processing unit (CPU). Here, the MCU 506 is responsible for sampling the back electromotive force signal of the BLDCM, and controls the three-phase full-bridge circuit 502 through the drive signal to drive the BLDCM 501.

Figure 6:
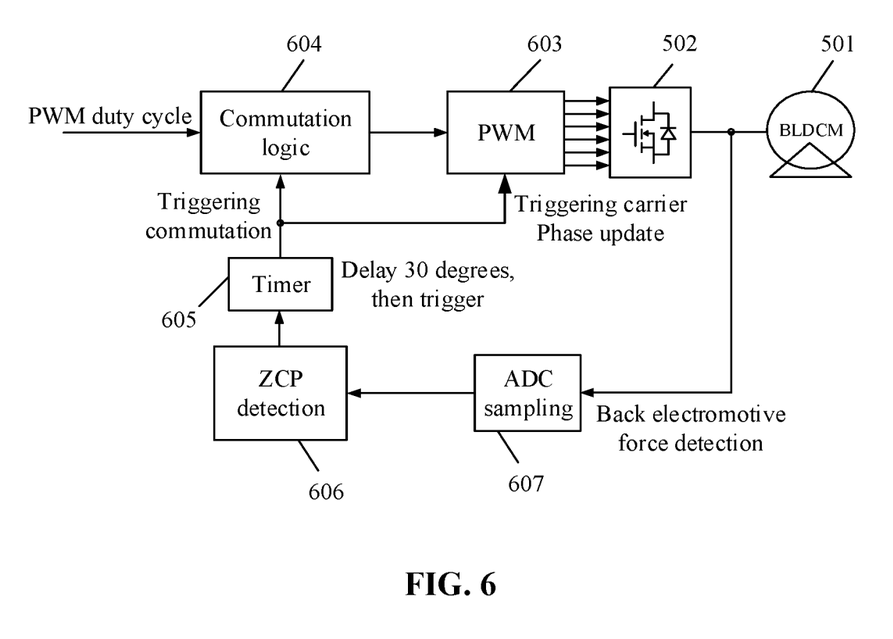
FIG. 6 is a schematic structural diagram of a commutation control system for a BLDCM according to some application embodiments of the disclosure.

In some application embodiments, it is implemented as the commutation control system for the BLDCM shown in FIG. 6. As shown in FIG. 6, the control system includes: a BLDCM 501, a three-phase full-bridge circuit 502, a PWM module 603, commutation logic 604, a timer 605, a back electromotive force ZCP detection module 606, and an Analog-to-Digital Converter (ADC) sampling module 607.

The ADC sampling module 607 samples the back electromotive force signal of the BLDCM, and then the ZCP detection module 606 detects the position of the ZCP continuously. Once the ZCP is detected, the timer 605 is immediately activated to delay 30 degree to trigger the commutation signal. When the commutation signal appears (that is, when it is determined that the BLDCM is to be commutated), the duty cycle of the PWM drive signal in the PWM module 603 is updated by finding in the commutation logic 604 (equivalent to the first mapping table), and the amplitude of the carrier signal in the PWM module 603 is triggered to be updated. The PWM module 603 obtains an updated PWM drive signal according to the updated duty cycle of the PWM drive signal and the carrier signal. The PWM drive signal acts on the three-phase full-bridge circuit 502, and finally the BLDCM 501 realizes the purpose of timely commutation.

In some application embodiments, in order to allow the PWM drive signal to control the BLDCM to perform commutation in time, the drive scheme indicated in the PWM drive signal is checked and determined to be correct, and then the PWM drive signal is used to control the BLDCM to perform commutation at the correct time.

Here, the duty cycle of the PWM drive signal directly reflects the amplitude of the PWM drive signal, and is used to control a manner in which the switching devices in the three-phase full-bridge circuit operate.

Regarding the implementation of updating the duty cycle of the PWM drive signal, in some practical applications, a commutation logic table (equivalent to the first mapping table) is configured and stored in the MCU 506 in advance. In some application embodiments of the disclosure, the commutation logic table is shown in Table 1, the position of the rotor in the BLDCM is from 0 degree to 360 degree, every 60 degree is classified as a sector; the driver outputs the corresponding drive scheme in each sector. In the drive scheme in Table 1, A, B, and C represent A-phase, B-phase and C-phase of the BLDCM respectively; + and − represent an upper switching device and a lower switching device of each of the phases respectively.

TABLE 1

| Rotor Position | 0°~60° | 60°~120° | 120°~180° | 180°~240° | 240°~300° | 300°~360° |
|---|---|---|---|---|---|---|
| Sector | I | II | III | IV | V | VI |
| Drive scheme | A + B− | A + C− | B + C− | B + A− | C + A− | C + B− |

Here, the H-PWM-L-ON modulation scheme in FIG. 2A is taken as an example, there are three states of each of the switching devices in FIG. 2A: a PWM state (corresponding to the segment of the square wave in S1, S3 and S5 in FIG. 2A), an all-on state (corresponding to the segment of the square wave in S2, S4 and S6 in FIG. 2A), an off state (corresponding to the segment without the square wave in S1 to S6 in FIG. 2A), here the three states directly reflect the operating voltage acting on each of the switching devices.

Here, Table 1, FIG. 1 and FIG. 2 are combined together to illustrate the specific implementation of updating the duty cycle of the PWM drive signal.

FIRST EXAMPLE

Commutation From Sector VI to Sector I is Taken as an Example

When it is determined that the BLDCM is to be commutated, and it is detected that the rotor in the BLDCM is at the position of 0 degree, and the drive scheme corresponding to the position of 0 degree where the rotor in the BLDCM is located is found from Table 1; the found drive scheme A+B− is used as the first drive scheme, that is, the upper switching device S1 of A-phase and the lower switching device S4 of B-phase in FIG. 1 is turned on at this time, and the remaining four devices S2, S3, S5, S6 are turned off; the operating voltage of each of the switching devices in the three-phase full-bridge circuit is obtained in conjunction with FIG. 2A, that is, the upper switching device S1 of A-phase is in the PWM state, the lower switching device S4 of B-phase is in the all-on state, and each of the remaining switching devices S2, S3, S5, S6 is in the off state. At this time, the register corresponding to the upper switching device S1 of A-phase is loaded with M (such as a value between 0 and 1); the register corresponding to the lower switching device S4 of B-phase is loaded with a maximum value (such as 1); each of four registers corresponding to the remaining four devices S2, S3, S5, S6 is loaded with a minimum value (such as 0).

SECOND EXAMPLE

Commutation From Sector I to Sector II is Taken as an Example

When it is determined that the BLDCM is to be commutated, and it is detected that the rotor in the BLDCM is at the position of 60 degree, and the drive scheme corresponding to the position of 60 degree where the rotor in the BLDCM is located is found from Table 1; the found drive scheme A+C− is used as the first drive scheme, that is, the upper switching device S1 of A-phase and the lower switching device S6 of C-phase in FIG. 1 is to be turned on at this time, and the remaining four devices S2, S3, S4, S5 are turned off; the operating voltage of each of the switching devices in the three-phase full-bridge circuit is obtained in conjunction with FIG. 2A, that is, the upper switching device S1 of A-phase is in the PWM state, the lower switching device S6 of C-phase is in the all-on state, and each of the remaining switching devices S2, S3, S4, S5 is in the off state. At this time, the register corresponding to the upper switching device S1 of A-phase is loaded with M (such as a value between 0 and 1); the register corresponding to the lower switching device S6 of C-phase is loaded with a maximum value (such as 1); each of four registers corresponding to the remaining four devices S2, S3, S4, S5 is loaded with a minimum value (such as 0).

It should be noted that in the process of implementing the digital PWM technique, the duty cycle of the PWM drive signal corresponding to each of the switching devices corresponds to the operating voltage of each of the switching devices after a series of conversion calculations in the processor.

The register corresponding to each of the switching devices in First Example and Second Example is the first register, and the duty cycle of the PWM drive signal is updated here.

Regarding the implementation of updating the phase of the PWM drive signal, in some practical applications, an initial configuration of the PWM module 602 in the MCU 506 is provided in advance. The main function of the PWM module 602 is to generate the PWM drive signal according to the PWM modulation wave signal (here, the PWM modulation wave signal and the duty cycle of the PWM drive signal are the same concept) and the PWM carrier signal. In some application embodiments of the disclosure, the following settings are made in the initial configuration of the PWM module 602.

1. The carrier in the carrier signal adopts a monotonically increasing wave (for example, a saw-tooth wave).

2. At a zero point of the carrier signal, the PWM drive signal starts to output a high level.

3. When the carrier signal is equal to the modulation wave signal, the PWM drive signal starts to output a low level.

4. The value of the first register of each of the switching devices is updated at the zero point of the carrier (that is, the state, such as the PWM state, the all-on state and the off state, of each of the switching devices are updated).

Figure 7:
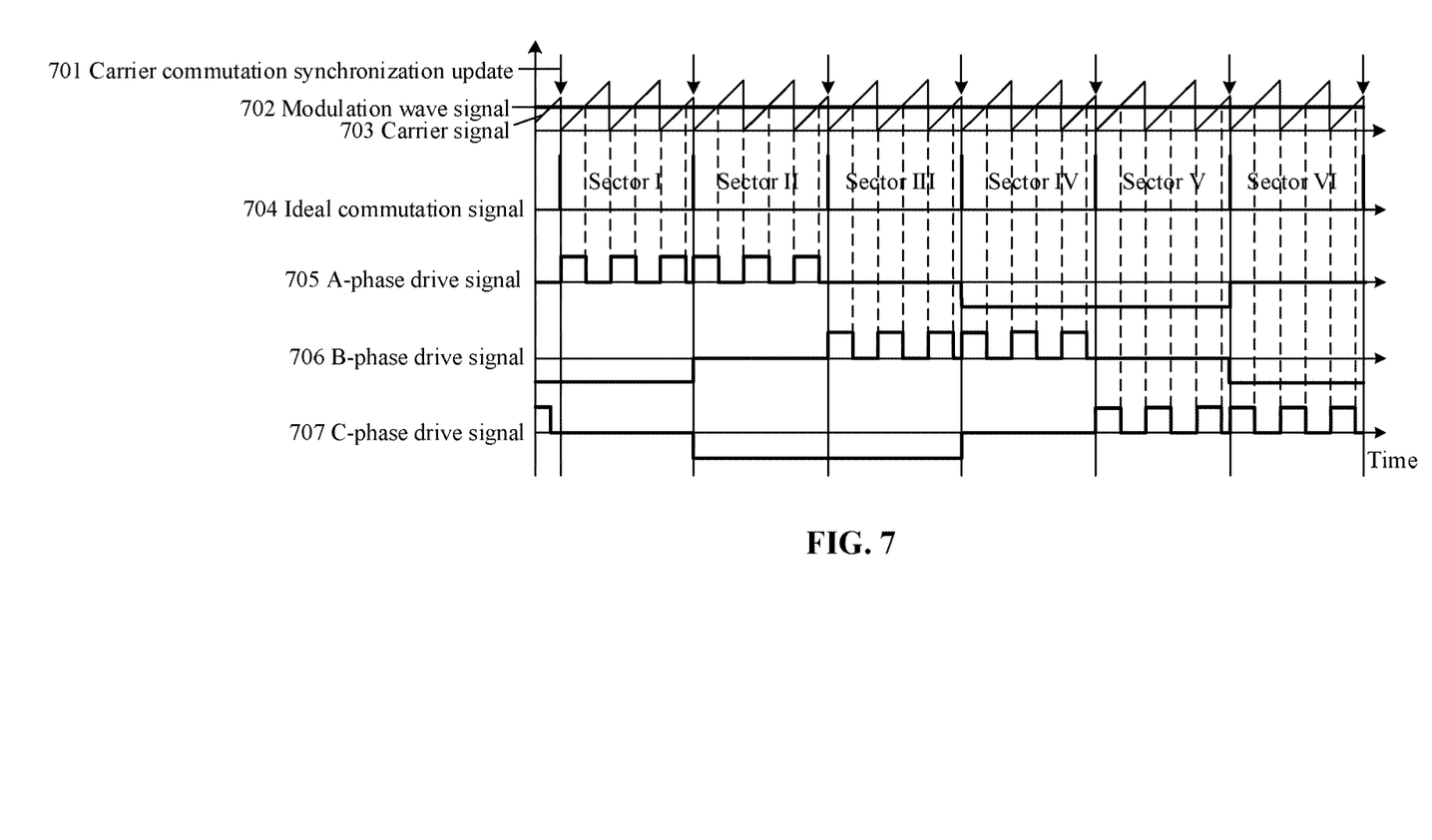
FIG. 7 is a schematic diagram of carrier commutation synchronization update, a modulation wave signal, a carrier signal, an ideal commutation signal, and respective phase drive signals in a process of implementing a commutation control method for a BLDCM according to some application embodiments of the disclosure.

FIG. 7 shows a schematic diagram of carrier commutation synchronization update. A carrier commutation synchronization update signal 701, a PWM modulation wave signal 702, a PWM carrier signal 703, an ideal commutation signal 704, an A-phase drive signal 705, a B-phase drive signal 706 and a C-phase drive signal 707 are included. In FIG. 7, according to the above-mentioned initial configuration rule of the PWM module 602, the PWM drive signal is generated from the PWM modulation wave signal 702 and the PWM carrier signal 703.

Here, when it is determined that the BLDCM is to be commutated, that is, when the ideal commutation signal 704 appears, the carrier commutation synchronization signal 701 is synchronously generated to forcibly update the amplitude of the PWM carrier signal 703. Here, forcibly updating the amplitude of the PWM carrier signal 703 may be specifically implemented by forcibly setting the value of the register corresponding to the PWM carrier signal. During specific implementation, the value of the register corresponding to the PWM carrier signal may be set to a specific value when it is determined that the commutation is to be carried out, where the specific value is a maximum value (such as the period value) or a minimum value (such as zero). In some application embodiments, the value of the register corresponding to the PWM carrier signal is set to zero. Since the state of each of the switching devices is updated at the zero point of the PWM carrier signal 703, after the amplitude of the PWM carrier signal 703 is forcibly updated in synchronization, the phase of the PWM drive signal will be changed immediately. This eliminates the problem that the carrier signal and the commutation signal are not synchronized.

It should be noted that in the process of implementing the digital PWM technique, the register corresponding to the PWM carrier signal is implemented in the form of a counter, that is, the PWM carrier signal counts from 0 to a period value in sequence according to a preset period, and then starts counting from 0 to the period value again after reaching the period value, and the cycle repeats in such way. In some application embodiments, the value of the register corresponding to the PWM carrier signal is directly set to 0 when it is determined that the commutation is to be carried out, and then the PWM carrier signal starts counting from 0 to the period value, and that cycle repeats in such way, which is shown as follows in FIG. 7: the saw-tooth wave in the PWM carrier signal 703 has a small saw-tooth wave after two large saw-tooth waves, when the value in the register is forcibly set to zero.

The register corresponding to the PWM carrier signal corresponding to each of the switching devices is the second register, where the phase of the PWM drive signal is updated.

Figure 8:
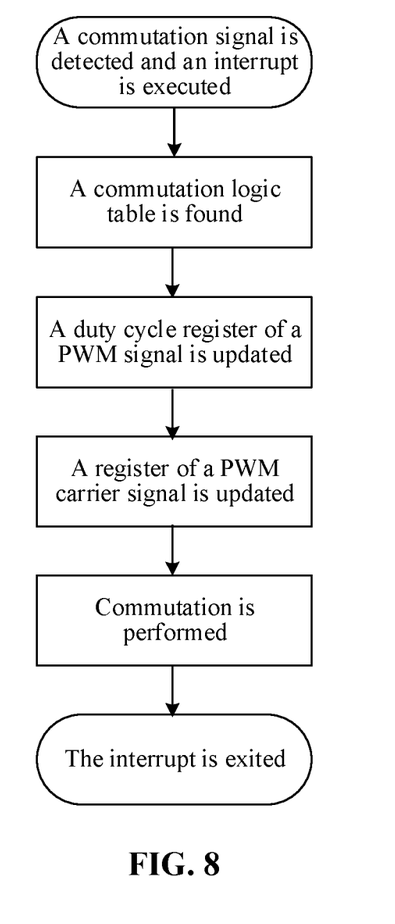
FIG. 8 is a schematic flowchart for implementing commutation for a BLDCM according to some application embodiments of the disclosure.

FIG. 8 is a flowchart of a process for implementing commutation for a BLDCM according to some application embodiments. As shown in FIG. 8, the flow includes the following operations.

(1) A commutation signal is detected and an interrupt is executed.

Here, when the commutation signal is detected, it is determined that the BLDCM is to be commutated, and the position of the rotor is further determined simultaneously.

(2) A commutation logic table is found.

According to the determined position of the rotor, the corresponding first drive scheme is found in the commutation logic table.

(3) A duty cycle register of a PWM signal is loaded.

Here, the operating voltage of each of the switching devices in the three-phase full-bridge circuit is determined according to the determined first drive scheme, and the operating voltage of each of the switching devices is used to load the amplitude of the modulation wave corresponding to each of the switching devices (as mentioned above, here the amplitude of the modulation wave and the PWM duty cycle are the same concept).

(4) A register of a PWM carrier signal is loaded.

Here, the value of the register of the PWM carrier signal corresponding to each of the switching devices is set to 0 when it is determined that commutation is to be carried out, here the phase of the PWM drive signal is updated immediately (that is, the state of each of the switching devices is updated instantly) when the PWM carrier signal is a minimum value. At the same time, the updated PWM drive signal is obtained.

(5) Commutation is performed.

A commutation operation is performed according to the updated PWM drive signal is performed.

(6) The interrupt is exited.

The above operations (1) to (6) are repeatedly performed to achieve a timely commutation for the BLDCM.

It may be seen from the above descriptions that in the embodiments of the disclosure, under the premise of ensuring the correct drive scheme, the amplitude of the PWM carrier signal is forcibly set to a minimum value when the BLDCM is to be commutated, which enables the state of the PWM drive signal to be updated immediately so that the BLDCM performs commutation timely, thereby ensuring the timeliness of commutation for the BLDCM and stability of commutation period, breaking inherent limits of the PWM update mechanism.

Figure 11A:
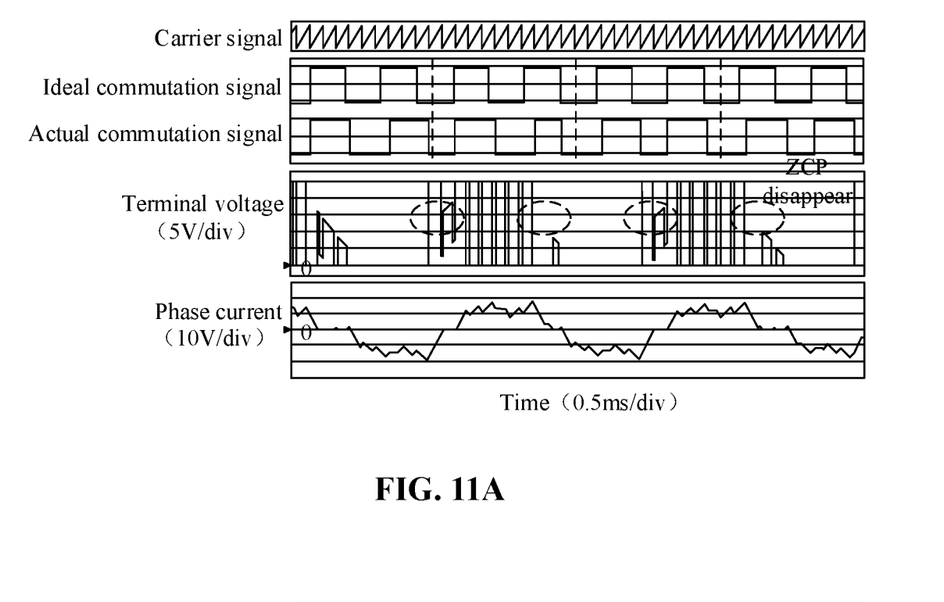
FIG. 11A is a schematic diagram of a carrier signal, an ideal commutation signal, an actual commutation signal, a terminal voltage and a terminal current without using the solution of some embodiments of the disclosure.
Figure 11B:
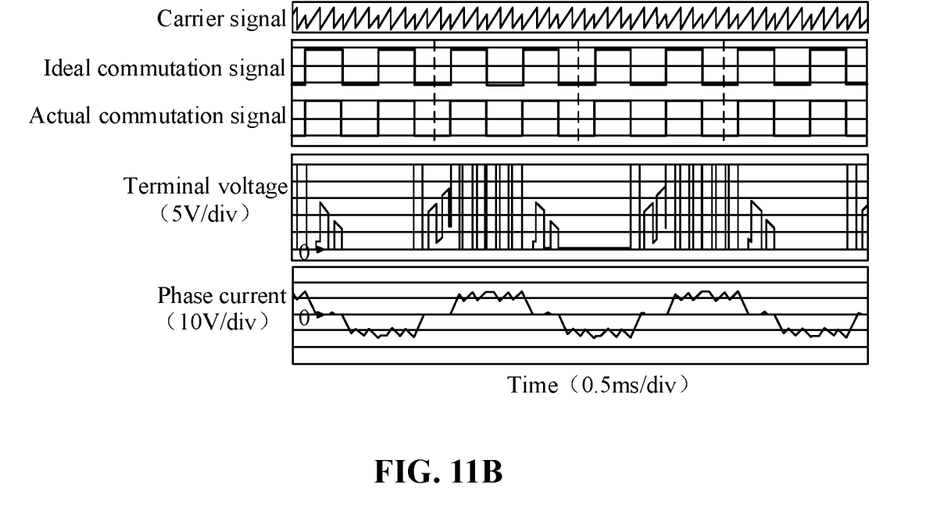
FIG. 11B is a schematic diagram of a carrier signal, an ideal commutation signal, an actual commutation signal, a terminal voltage and a terminal current by using the solution of some embodiments of the disclosure.

On the other hand, as shown in FIG. 11A and FIG. 11B, under the condition that the solutions of the embodiments of the disclosure are used, the waveform of the actual commutation signal is uniform and closer to the ideal commutation signal, and the situation that ZCP disappears in the process of detecting the terminal voltage is avoided, and the oscillation amplitude of the terminal current is smaller. That is, the embodiments of the disclosure ensure stability of commutation period so that the freewheeling end time is relatively stable when the PWM state changes, thereby ensuring the possibility of detecting ZCP, meanwhile alleviating problems such as current oscillation for the BLDCM, reduction of working efficiency, increased noise, and instability of controlling the BLDCM, and the like.

Figure 9:
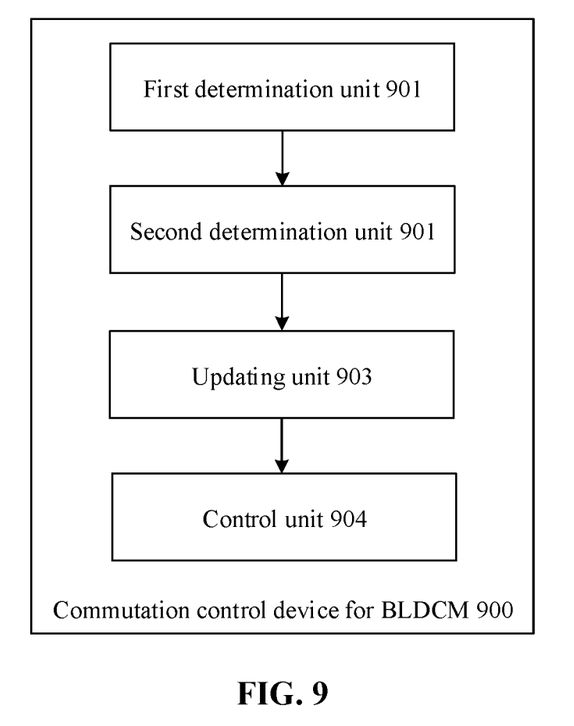
FIG. 9 is a schematic structural diagram of composition of a commutation control device for a BLDCM according to some embodiments of the disclosure.

In order to implement the method according to the embodiments of the disclosure, the embodiments of the disclosure further provide a commutation control device for a BLDCM, and FIG. 9 is a schematic structural diagram of a composition of an device according to some embodiments of the disclosure, as shown in FIG. 9, the device 900 includes: a first determination unit 901, a second determination unit 902, an updating unit 903 and a control unit 904.

The first determination unit 901 is configured to detect a position of a rotor in the BLDCM, here the detecting is further configured to be triggered by commutation of the BLDCM.

The second determination unit 902 is configured to determine a first drive scheme, corresponding to the detected position of the rotor, of the BLDCM, here the first drive scheme indicates a manner in which a three-phase full-bridge circuit of the BLDCM operates.

The updating unit 903 is configured to update a PWM drive signal on the basis of the determined first drive scheme.

The control unit 904 is configured to control the BLDCM by using the updated PWM drive signal, to perform commutation.

In some embodiments, the updating unit 903 includes a first updating module and a second updating module.

The first updating module is configured to update, according to the first drive scheme, a duty cycle of the PWM drive signal.

The second updating module is configured to update a phase of the PWM drive signal.

In some embodiments, the first updating module is configured to: determine, by using the first drive scheme, an operating voltage of each of switching devices in the three-phase full-bridge circuit; and update, by using the determined operating voltage of each of the switching devices, a duty cycle of a respective PWM drive signal corresponding to each of the switching devices.

In some embodiments, the first updating module is configured to: for each of the switching devices in the three-phase full-bridge circuit, update the duty cycle of the PWM drive signal by updating a value of a first register corresponding to the duty cycle of the respective PWM drive signal.

In some embodiments, the second updating module is configured to update the phase of the PWM drive signal by updating a value of a second register corresponding to a PWM carrier signal.

In some embodiments, the second updating module is configured to: obtain an updated carrier signal by setting the value of the second register to a specific value when it is determined that commutation is t to be carried out; and update, by using the updated carrier signal, the phase of the PWM drive signal.

In some embodiments, the first determination unit 901 is configured to: acquire a back electromotive force signal of the BLDCM; determine, according to the acquired back electromotive force signal, a back electromotive force ZCP time of the BLDCM; and determine, when a first time elapses after the back electromotive force ZCP time, that the BLDCM is to be commutated.

In some embodiments, the second determination unit 902 is configured to: find, in a first mapping table, a drive scheme corresponding to the detected position of the rotor;

use the found drive scheme as the first drive scheme.

In some embodiments, a PWM modulation scheme of the PWM drive signal is H-PWM-L-ON, or H-ON-L-PWM, or ON-PWM, or PWM-ON.

In some practical applications, the first determination unit 901, the second determination unit 902, the updating unit 903 and the control unit 904 may be implemented by a processor in the commutation control device for the BLDCM.

It should be noted that when performing the control of commutation for the BLDCM, the commutation control device for the BLDCM provided by the above embodiments only uses the division of the above-mentioned program modules as an illustrative example. In a practical application, the above process allocation may be completed by different program modules as needed, that is, the internal structure of the device is divided into different program modules to complete all or part of the above-mentioned processes. Moreover, the embodiments of the commutation control device for the BLDCM and of the commutation control method for the BLDCM provided in the above embodiments belong to the same concept, and the specific implementation thereof may refer to the method embodiments for the details, which will not be repeated here.

Figure 10:
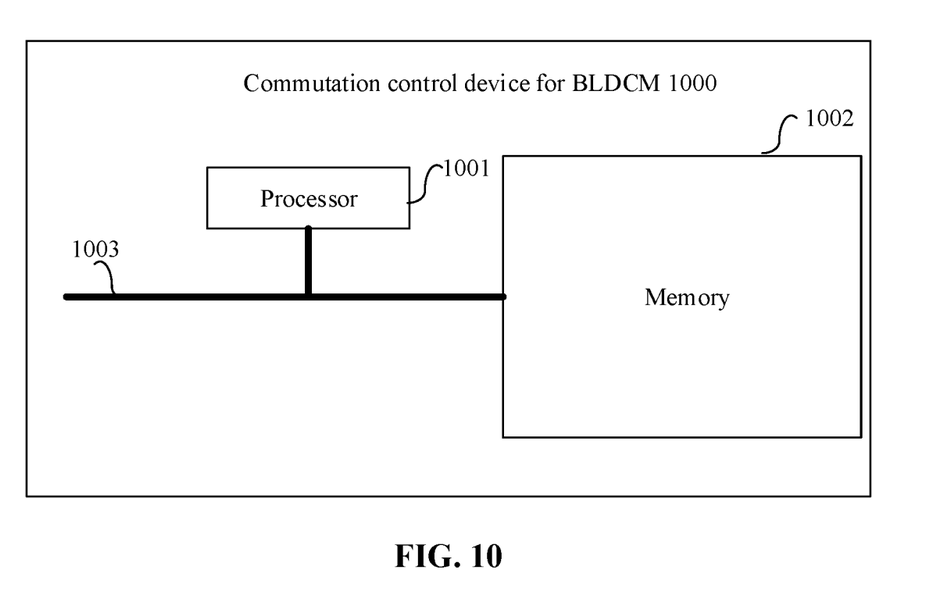
FIG. 10 is a schematic structural diagram of hardware composition of a commutation control device for a BLDCM according to some embodiments of the disclosure.

Based on the hardware implementation of the above-mentioned program modules, and in order to implement the method according to the embodiments of the disclosure, the embodiments of the disclosure provide a device for determining a back electromotive force ZCP threshold for a BLDCM. As shown in FIG. 10, the device 1000 includes a processor 1001, and a memory 1002 configured to store computer programs executable on the processor.

The processor 1001 is configured to execute the method provided by one or more of the above-mentioned technical solutions when executing the computer programs.

In a practical application, as shown in FIG. 10, the components of the device 1000 are coupled together by a bus system 1003. It may be appreciated that the bus system 1003 is configured to implement connection and communication among these components. The bus system 1003 includes, in addition to data bus, power bus, control bus, and status signal bus. For clarity, however, various buses are labeled as the bus system 1003 in FIG. 10.

In some exemplary embodiments, the embodiments of the disclosure further provide a storage medium, which is a computer-readable storage medium, such as a memory 1002 including computer programs executable by the processor 1001 of the a device 1000 for determining a back electromotive force ZCP threshold for a BLDCM, to perform operations described in the foregoing methods. The computer-readable storage medium may be Ferromagnetic Random Access Memory (FRAM), Read Only Memory (ROM), Programmable Read-Only Memory (PROM), Erasable Programmable Read-Only Memory (EPROM), Electrically Erasable Programmable Read-Only Memory (EEPROM), Flash Memory, magnetic surface memory, optical disk, or memory such as Compact Disc Read-Only Memory (CD-ROM), etc.

It should be noted that the terms "first", "second" or the like are used to distinguish among similar objects, rather than describing a specific order or sequence.

In addition, the technical solutions described in the embodiments of the disclosure may be combined arbitrarily without conflict.

The foregoing descriptions are merely illustrative of the preferred embodiments of the disclosure and are not intended to limit the protection scope of the disclosure.

The invention claimed is:

1. A commutation control method for a Brush Less Direct Current Motor (BLDCM), comprising:
 detecting a position of a rotor in the BLDCM, wherein the detecting is further configured to be triggered by commutation of the BLDCM;
 determining a first drive scheme, corresponding to the detected position of the rotor of the BLDCM, wherein the first drive scheme indicates a manner in which a three-phase full-bridge circuit of the BLDCM operates;
 updating a Pulse Width Modulation (PWM) drive signal, wherein the updating is performed based on the first drive scheme; and
 controlling the BLDCM by using the updated PWM drive signal, to perform commutation.

2. The method of claim 1, wherein the updating the PWM drive signal, wherein the updating is performed based on the first drive scheme comprises:

updating, according to the first drive scheme, a duty cycle of the PWM drive signal; and updating a phase of the PWM drive signal.

3. The method of claim 2, wherein the updating, according to the first drive scheme, the duty cycle of the PWM drive signal comprises:

determining, by using the first drive scheme, an operating voltage of each of switching devices in the three-phase full-bridge circuit; and updating, by using the determined operating voltage of each of the switching devices, a duty cycle of a respective PWM drive signal corresponding to each of the switching devices.

4. The method of claim 3, wherein for each of the switching devices in the three-phase full-bridge circuit, the duty cycle of the PWM drive signal is updated by updating a value of a first register corresponding to the duty cycle of the respective PWM drive signal.

5. The method of claim 2, wherein the updating the phase of the PWM drive signal comprises:

updating, by updating a value of a second register corresponding to a PWM carrier signal, the phase of the PWM drive signal.

6. The method of claim 5, wherein the updating, by updating the value of the second register corresponding to the PWM carrier signal, the phase of the PWM drive signal comprises:

obtaining an updated carrier signal by setting the value of the second register to a specific value when it is determined that commutation is to be carried out; and updating, by using the updated carrier signal, the phase of the PWM drive signal.

7. The method of claim 1, further comprising:

acquiring a back electromotive force signal of the BLDCM;

determining, according to the acquired back electromotive force signal, a back electromotive force zero-crossing point (ZCP) time of the BLDCM; and determining, when a first time elapses after the back electromotive force ZCP time, that the BLDCM is to be commutated.

8. The method of claim 1, wherein the determining the first drive scheme, corresponding to the detected position of the rotor, of the BLDCM comprises:

finding, in a first mapping table, a drive scheme corresponding to the detected position of the rotor; and using the found drive scheme as the first drive scheme.

9. The method of claim 1, wherein a PWM modulation scheme of the PWM drive signal is H-PWM-L-ON, or H-ON-L-PWM, or ON-PWM, or PWM-ON.

10. A commutation control device for a Brush Less Direct Current Motor (BLDCM), comprising: a processor, and a memory configured to store computer programs executable on the processor;

wherein the processor is configured to perform operations of the method of claim 1 when executing the computer programs.

11. A storage medium, having stored therein computer programs that, when executed by a processor, causes the processor to implement operations of the method of claim 1.

12. A commutation control device for a Brush Less Direct Current Motor (BLDCM), comprising:

a first determination unit, configured to detect a position of a rotor in the BLDCM, wherein the detecting is further configured to be triggered by commutation of the BLDCM;

a second determination unit, configured to determine a first drive scheme, corresponding to the detected position of the rotor, of the BLDCM, wherein the first drive scheme indicates a manner in which a three-phase full-bridge circuit of the BLDCM operates;

an updating unit, configured to update a Pulse Width Modulation (PWM) drive signal, wherein the updating is performed based on the first drive scheme; and a control unit, configured to control the BLDCM by using the updated PWM drive signal, to perform commutation.

\* \* \* \* \*